United States Patent [19]
Yamamoto

[11] Patent Number: 5,621,382
[45] Date of Patent: Apr. 15, 1997

[54] DISPLAY APPARATUS FOR A BICYCLE

[75] Inventor: Seiji Yamamoto, Sakai, Japan

[73] Assignee: Shimano, Inc., Osaka, Japan

[21] Appl. No.: 260,858

[22] Filed: Jun. 16, 1994

[30] Foreign Application Priority Data

Jun. 16, 1993 [JP] Japan ................. 5-032339 U

[51] Int. Cl.$^6$ ........................................ B62J 3/00
[52] U.S. Cl. .................. 340/432; 340/456; 74/489; 116/28.1; 474/81; D12/114; 434/61; 482/902; 482/57; 345/35
[58] Field of Search .................. 340/432, 456, 340/461, 462; 74/489; 116/28.1; 474/81; D10/98; D12/114; 434/61, 247; 482/902, 57; 345/35, 83, 88; 73/379.01, 379.07

[56] References Cited

U.S. PATENT DOCUMENTS

| | | | |
|---|---|---|---|
| 3,926,142 | 12/1975 | Okamoto | 116/62.2 |
| 4,859,984 | 8/1989 | Romano | 340/432 |
| 4,862,395 | 8/1989 | Fey et al. | 340/432 |
| 5,178,033 | 1/1993 | Kund | 116/28.1 |
| 5,373,308 | 12/1994 | Kurisu et al. | 345/35 |

FOREIGN PATENT DOCUMENTS

| | | |
|---|---|---|
| 2663117 | 12/1991 | France . |
| 3732815 | 3/1988 | Germany . |

*Primary Examiner*—Nina Tong
*Attorney, Agent, or Firm*—James A. Deland

[57] ABSTRACT

A display apparatus for a bicycle has a display panel (3). The display panel (3) includes a plurality of rear speed stage display sections (21–28) for displaying a speed stage of a rear derailleur. The rear speed stage display sections are formed of a plurality of sets of display elements. The display panel further includes a plurality of front speed stage display sections (29a–29c) for displaying a speed stage of a front derailleur. Each of the front speed stage display sections includes one set of display elements. An indicating device is provided for controlling one of the display elements in one set, thereby to indicate the speed stages of the front derailleur and rear derailleur.

11 Claims, 4 Drawing Sheets

DISPLAY APPARATUS FOR A BICYCLE

BACKGROUND OF THE INVENTION

1. Field of the Invention

The present invention relates to a display apparatus for a bicycle for displaying speed stages of a front derailleur and a rear derailleur.

2. Description of the Related Art

A conventional display apparatus is disclosed in Japanese Patent Publication Kokai No. 63-90490, for example. This apparatus includes one liquid crystal display having an analog display window for displaying a speed stage of a front derailleur and an analog display window for displaying a speed stage of a rear derailleur. Each display window displays a speed stage by blacking display elements forming the display window. That is, a speed stage of the front derailleur is displayed by the display elements acting exclusively as means for displaying the speed stage of the front derailleur, and an indicating device exclusively for blacking these display elements. A speed stage of the rear derailleur is displayed by the display elements acting exclusively as means for displaying the speed stage of the rear derailleur, and an indicating device exclusively for blacking these display elements.

In conventional practice, therefore, the display of a speed stage of the front derailleur is indicated by its own indicating device, while the display of a speed stage of the rear derailleur is indicated by its own indicating device. The display of speed stages of the front and rear derailleurs requires two indicating devices. Many or complicated devices are required to control the two indicating devices, resulting in the disadvantage of high manufacturing cost.

SUMMARY OF THE INVENTION

An object of the present invention is to provide a display apparatus for a bicycle which allows the rider to perceive speed stages of both a front derailleur and a rear derailleur by looking at one display plane, and which may be manufactured with advantages in terms of construction and cost.

The above object is fulfilled, according to the present invention, by a display apparatus for a bicycle comprising a display device (or display panel) including a plurality of rear speed stage display sections for displaying a speed stage of a rear derailleur, a plurality of front speed stage display sections for displaying a speed stage of a front derailleur, and an indicating device. The rear speed stage display sections are formed of a plurality of sets of display elements. Each of the front speed stage display sections includes one set of display elements. The indicating device controls one of the display elements in one set, thereby to indicate the speed stages of the front derailleur and rear derailleur.

Thus, the single indicating device, on the single display panel, indicates the front and rear speed stage display sections to display speed stages of the front and rear derailleurs.

Where the display apparatus is used for displaying speed stages in which the front and rear derailleurs are actually operating, the rider may perceive the speed stages of the front and rear derailleurs easily by looking at the single display panel.

Where the display apparatus is used for indicating appropriate speed stages to which the front and rear derailleurs should be switched, the rider may perceive the speed stages to which the front and rear derailleurs should be switched, easily by looking at the single display panel. Whichever is the use of the display apparatus, the rider may effect a shifting operation accurately. Moreover, since the single indicating device is used for operation of both the front and rear derailleurs, the apparatus may be manufactured simply, easily and at low cost from the viewpoints of the number of indicating device required and of the construction for controlling the indicating device.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

Figure 1:
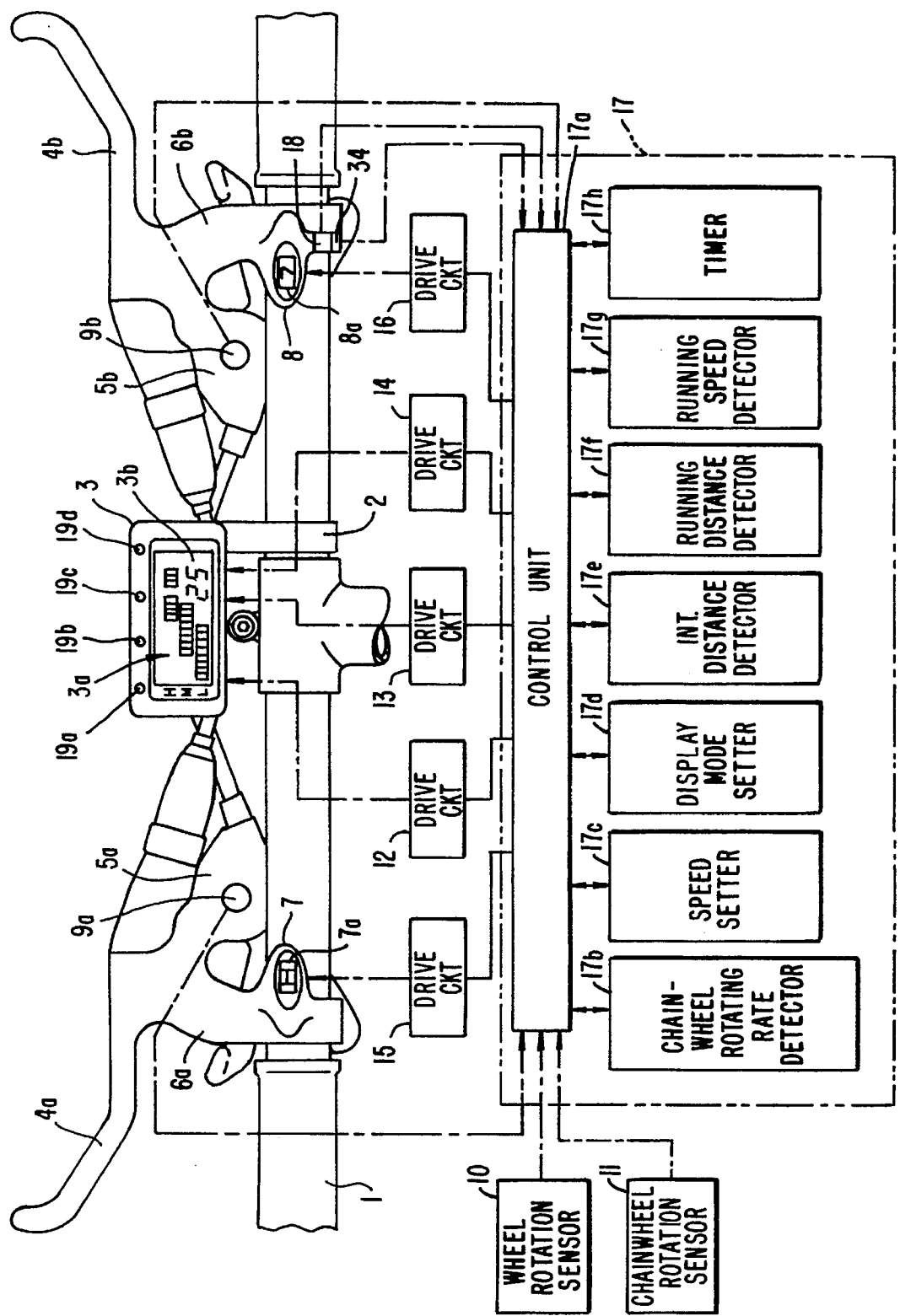
FIG. 1 is a view showing a control system of a display apparatus for a bicycle according to the present invention.

As shown in FIG. 1, a display apparatus for a bicycle includes a first display panel 3 fixed to a longitudinally middle position of a handlebar 1 through a bracket 2; a second display panel 7 formed on a lever bracket 6a attached to the handlebar 1 adjacent a left grip and supporting a left brake lever 4a and a left shifting device 5a; a third display panel 8 formed on a lever bracket 6b attached to the handlebar 1 adjacent a right grip and supporting a right brake lever 4b and a right shifting device 5b; a pair of speed stage sensors 9a and 9b attached to the shifting devices 5a and 5b, respectively; a first rotating rate detecting mechanism 10 for detecting a rotating rate of a front wheel; a second rotating rate detecting mechanism 11 for detecting a rotating rate of a chainwheel; drive circuits 12, 13 and 14 for driving the first display panel 3; a drive circuit 15 for driving the second display panel 7; a drive circuit 16 for driving the third display panel 8; and a control mechanism 17 operable in response to the sensors 9a and 9b and the rotating rate detecting mechanisms 10 and 11.

Figure 3:
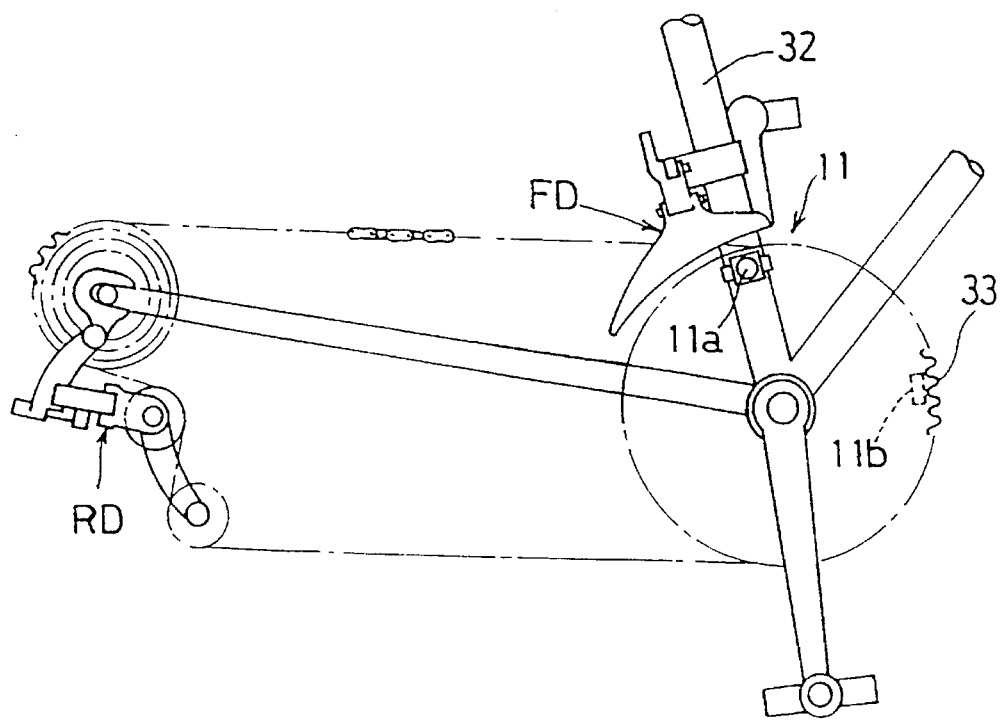
FIG. 3 is a side view showing a second rotating rate detecting mechanism.

The control mechanism 17 comprises a microcomputer having a control unit 17a, a chainwheel rotating rate detector 17b, a speed setter 17c, a display mode setter 17d, an integrated distance detector 17e, a running distance detector 17f, a running speed detector 17g and a timer 17h. The first display panel 3 includes a first display area 3a for displaying a speed stage of a front derailleur, as shown in FIG. 3, which is operable by tile shifting device 5a, and a speed stage of a rear derailleur, as also shown in FIG. 3, which is operable by the shifting device 5b. The first display panel 3 further includes a second display area 3b for selectively displaying a running speed, a running distance, an integrated distance and time. The second display panel 7 includes a display area 7a for displaying an appropriate speed stage to be established by the front derailleur. The third display panel 8 includes a display area 8a for displaying an appropriate speed stage to be established by the rear derailleur. The running speed, running distance, integrated distance or time is selected for display in the second display area 3b of the first display panel 3 by a push-button type mode selector switch 18 attached to the lever bracket 6b adjacent a mounting band thereof. The first display panel 3 includes four mode indicator lamps 19a–19d for indicating which of the four types of information is displayed in the second display area 3b of the first display panel 3. This construction will be described in detail below.

Figure 4:
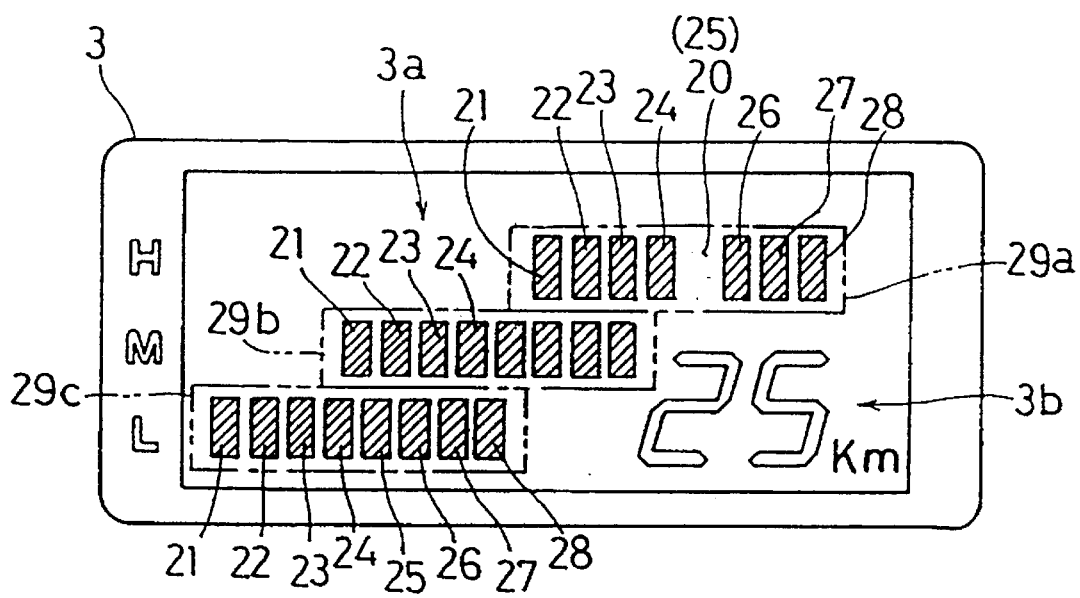
FIG. 4 is a front view of a first display panel.

Each of the speed stage sensors 9a and 9b detects a speed stage of the front or rear derailleur connected to the shifting device 5a or 5b through a control cable (not shown). The speed stage is detected from a rotational position of a cable takeup element (not shown) of the shifting device 5a or 5b. That is, the takeup element is connected to the front or rear derailleur through the control cable to switch the front or rear derailleur, and a rotational position of the takeup element is detected as a speed stage. A result of detection is outputted as an electric signal to the control unit 17a. In response to the signals outputted from the speed stage sensors 9a and 9b, the control unit 17a automatically outputs a signal to the drive circuit 12 of the first display panel 3 to display the speed stages detected by the speed stage sensors 9a and 9b. In response to the signal from the control unit 17a, the drive circuit 12 controls the first display area 3a of the first display panel 3. Then, the first display panel 3 displays the speed stages of the front and rear derailleurs. FIG. 4 shows details of the first display panel 3, in which the speed stages of the front and rear derailleurs are displayed in a single display area, i.e. the first display area 3a, and by a single indicator 20.

The display area 3a includes a first front speed stage display section (or first display array) 29a, a second front speed stage display section (or second display array) 29b and a third front speed stage display section (or third display array) 29c. The first, second and third display arrays are arranged vertically in the display area 3a. Each of these display sections 29a–29c includes eight rear speed stage display elements 21–28 corresponding to speed stages of the rear derailleur and arranged linearly across the display area 3a. The rear speed stage display elements 21–28 are called herein one set of display elements. That is, each of the first, second and third display arrays is composed of one set of display elements 21–28.

The first front speed stage display section (or first display array) 29a shows a high speed stage H of the front derailleur. The second front speed stage display section (or second display array) 29b shows an intermediate speed stage M of the front derailleur. The third front speed stage display section (or third display array) 29c shows a low speed stage L of the front derailleur. The eight display elements (one set of display elements) 21–28 in each of the front speed stage display sections (display arrays) 29a–29c show the speed stages of the rear derailleur. For example, the display element at the left end shows a first speed of the rear derailleur, the next display element shows a next speed and so on. All of the display elements 21–28 are formed of liquid crystal elements. One of the elements 21, 22 . . . , or 28 is turned to a colorless state (as at 20 in FIG. 4), and all the other elements 21–28 are colored (e.g. black). The element in the colorless state (as at 20 in FIG. 4) acts as the indicator to indicate a speed stage of the front derailleur and a speed stage of the rear derailleur. As shown in FIG. 4, for example, when the fifth rear speed stage display element 25 counted from the left end of the first front speed stage display section (first display array) 29a is turned to the colorless state (as at 20 in FIG. 4) and all the other elements 21, 22, 23, 24, 26, 27 and 28 are colored, the speed stage sensor 9a is detecting the high speed stage H and the speed stage sensor 9b is detecting the fifth speed. That is, the front derailleur is in the high speed stage H, and the rear derailleur provides the fifth speed.

The speed stages of the front and rear derailleurs may be detected by detecting positions thereof.

The first front speed stage display section (first display array) 29a and second front speed stage display section (second display array) 29b are sideways staggered relative to each other in the display area 3a. Thus, the three lower rear speed stage display elements 21, 22 and 23 in the first front speed stage display section 29a and the three higher rear speed stage display elements 26, 27 and 28 in the second front speed stage display section 29b are vertically aligned to indicate the same wheel driving gear ratios, respectively. In other words, the chainwheel and rear wheel are driven at the same gear ratio when the front derailleur is in the high speed stage H and the rear derailleur is in the first speed position and when the front derailleur is in the intermediate speed stage M and the rear derailleur is in the sixth speed position. The chainwheel and rear wheel are driven at the same gear ratio when the front derailleur is in the high speed stage H and the rear derailleur is in the second speed position and when the front derailleur is in the intermediate speed stage M and the rear derailleur is in the seventh speed position. Further, the chainwheel and rear wheel are driven at the same gear ratio when the front derailleur is in the high speed stage H and the rear derailleur is in the third speed position and when the front derailleur is in the intermediate speed stage M and the rear derailleur is in the eighth speed position.

The second front speed stage display section 29b and third front speed stage display section (second display array) 29c are also sideways staggered relative to each other in the display area 3a. The four lower rear speed stage display elements 21, 22, 23 and 24 in the second front speed stage display section 29b and the five higher rear speed stage display elements 24, 25, 26, 27 and 28 in the third front speed stage display section 29c are partially overlapping one another vertically of the display area 3a to indicate approximately the same wheel driving gear ratios, respectively. In other words, the chainwheel and rear wheel are driven at approximately the same gear ratio when the front derailleur is in the intermediate speed stage M and the rear derailleur is in the first speed position and when the front derailleur is in the low speed stage L and the rear derailleur is in the fourth or fifth speed position. The chainwheel and rear wheel are driven at approximately the same gear ratio when the front derailleur is in the intermediate speed stage M and the rear derailleur is in the second speed position and when the front derailleur is in the low speed stage L and the rear derailleur is in the fifth or sixth speed position. The chainwheel and rear wheel are driven at approximately the same gear ratio when the front derailleur is in the intermediate speed stage M and the rear derailleur is in the third speed position and when the front derailleur is in the low speed stage L and the rear derailleur is in the sixth or seventh speed position. The chainwheel and rear wheel are driven at approximately the same gear ratio when the front derailleur is in the intermediate speed stage M and the rear derailleur is in the fourth speed position and when the front derailleur is in the low speed stage L and the rear derailleur is in the seventh or eighth speed position. Further, when the front derailleur is in the intermediate speed stage M and the rear derailleur is in the first speed position, the chainwheel and rear wheel are driven at a gear ratio between the gear ratio provided when the front derailleur is in the low speed stage L and the rear derailleur is in the fourth speed position and the gear ratio provided when the front derailleur is in the low speed stage L and the rear derailleur is in the fifth speed position. When the front derailleur is in the intermediate speed stage M and the rear derailleur is in the second speed position, the chainwheel and rear wheel are driven at a gear ratio between the gear ratio provided when the front derailleur is in the low speed stage L and the rear derailleur is in the fifth speed position and the gear ratio provided when the front derailleur is in the low speed stage L and the rear derailleur is in the sixth speed position. When the front derailleur is in the intermediate speed stage M and the rear derailleur is in the third speed position, the chainwheel and rear wheel are driven at a gear ratio between the gear ratio provided when the front derailleur is in the low speed stage L and the rear derailleur is in the sixth speed position and the gear ratio provided when the front derailleur is in the low speed stage L and the rear derailleur is in the seventh speed position. When the front derailleur is in the intermediate speed stage M and the rear derailleur is in the fourth speed position, the chainwheel and rear wheel are driven at a gear ratio between the gear ratio provided when the front derailleur is in the low speed stage L and the rear derailleur is in the seventh speed position and the gear ratio provided when the front derailleur is in the low speed stage L and the rear derailleur is in the eighth speed position.

Figure 2:
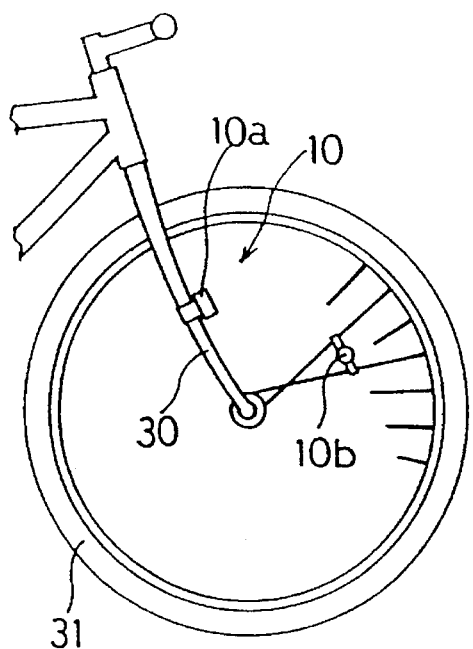
FIG. 2 is a side view showing a first rotating rate detecting mechanism.

As shown in FIG. 2, the first rotating rate detecting mechanism 10 includes a rotation sensor 10a attached to a front fork 30, and a detected object 10b attached to spokes of a front wheel 31. The rotation sensor 10a outputs a pulse signal to the control unit 17a each time the detected object 10b passes through a detecting region of the rotation sensor 10a with rotation of the front wheel 31.

As shown in FIG. 3, the second rotating rate detecting mechanism 11 includes a rotation sensor 11a attached to a bicycle frame 32, and a detected object 11b attached to a chainwheel 33. The rotation sensor 11 a outputs a pulse signal to the control unit 17a each time the detected object 11 b passes through a detecting region of the rotation sensor 11a with rotation of the chainwheel 33.

The control mechanism 17 determines an actual running speed of the bicycle based on counting and computation processing by the control unit 17a and speed detector 17g of the pulse signal from the rotation sensor 10a of the first rotating rate detecting mechanism 10. Further, the control mechanism 17 determines an actual rotating rate of the chainwheel 33 based on counting and computation processing by the control unit 17a and rotating rate detector 17b of the pulse signal from the rotation sensor 11a of the second rotating rate detecting mechanism 11. Then, based on correlations between a running speed and a chainwheel rotating rate inputted to the speed stage setter 17c and the actually detected running speed and chainwheel rotating rate, a speed stage detected by the speed stage sensor 9a and a speed stage detected by the speed stage sensor 9b, the control mechanism 17 determines speed stages corresponding to the above correlations for the front and rear derailleurs, and establishes these speed stages as speed stages to which the front and rear derailleurs should be switched. Then, the control unit 17a outputs a signal to the drive circuit 15 of the second display panel 7 for causing the second display panel 7 to display the speed stage established for the front derailleur. As a result, the second display panel 7 displays in the display area 7a the proper speed stage of the front derailleur. Further, the control unit 17a outputs a signal to the drive circuit 16 of the third display panel 8 for causing the third display panel 8 to display the speed stage established for the rear derailleur. As a result, the third display panel 8 provides a digital display, in a numeral, in the display area 7a of the proper speed stage of the front derailleur.

Instead of detecting the rotating rate of the chainwheel 33, a rotating rate of a crank axle may be detected by attaching the detected object to a crank arm.

The control mechanism 17 determines a running distance from a detection starting point based on counting and computation processing by the control unit 17a, running distance detector 17f and timer 17h of the pulse signal from the rotation sensor 10a of the first rotating rate detecting mechanism 10, and stores the running distance in the running distance detector 17f. The running distance stored in the running distance detector 17f is counted and computed by the control unit 17a and integrated distance detector 17e to determine an integrated distance from a detection starting point. The integrated distance is stored in the integrated distance detector 17e. When the mode selector switch 18 is operated, the control mechanism 17 selects one of display modes inputted from the display mode setter 17d beforehand, i.e. a timer mode, a running speed mode, a running distance mode and an integrated distance mode, for display in the second display area 3b of the first display panel 3. Then, the control unit 17a outputs, to the drive circuit 14, a signal for switching the second display area 3b to a selected display mode, and a signal for causing the second display area 3b to display the running speed, running distance, integrated distance or time. In response to these signals, the drive circuit 14 causes the second display area 3b to display the selected information. Thus, the second display area 3b of the first display panel 3 displays time in the timer mode, the running speed in the running speed mode, the running distance in the running distance mode, or the integrated distance in the integrated distance mode. The second display area 3b is a numeric type liquid crystal display area to provide a digital display of time, running speed, running distance or integrated distance.

Each time the mode selector switch 18 is operated, the control unit 17a outputs a signal to switch the second display area 3b in the order of timer mode, running speed mode, running distance mode and integrated distance mode. Consequently, the second display area 3b successively displays time, running speed, running distance and integrated distance.

Simultaneously with the signal for switching the second display area 3b to the timer mode, running speed mode, running distance mode or integrated distance mode, the control unit 17a outputs a signal to the drive circuit 13 for lighting one of the mode indicator lamps 19a–19d. In response to this signal the drive circuit 13 turns on or off the mode indicator lamps 19a–19d. The mode indicator lamp 19a is lit when time is displayed in the second display area 3b. The mode indicator lamp 19b is lit when a running speed is displayed in the second display area 3b. The mode indicator lamp 19c is lit when a running distance is displayed in the second display area 3b. The mode indicator lamp 19d is lit when an integrated distance is displayed in the second display area 3b.

FIG. 1 shows a push-button switch 34 for resetting the running distance stored in the running distance detector 17f and the integrated distance stored in the integrated distance detector 17e. That is, the switch 34 resets the running distance or integrated distance displayed in the second display area 3b. This reset switch 34 and the mode selector switch 18 are disposed adjacent the mounting band of the lever bracket 6b to enable the rider to operate these switches easily with the hand holding the right grip of the handlebar 1.

In the foregoing embodiment, to enable the single indicator to indicate speed stages of the front and rear derailleurs, the front speed stage display sections (display arrays) are arranged vertically in the display area, and the rear speed stage display elements arranged linearly across the display area. Instead, the front speed stage display sections (display arrays) may be arranged across the display area, with the rear speed stage display elements arranged vertically in the display area. Such vertical and transverse arrangements provide the advantage of facilitating observation by the rider. Further, the display sections and display elements may be inclined with respect to the transverse or vertical direction.

Figure 5:
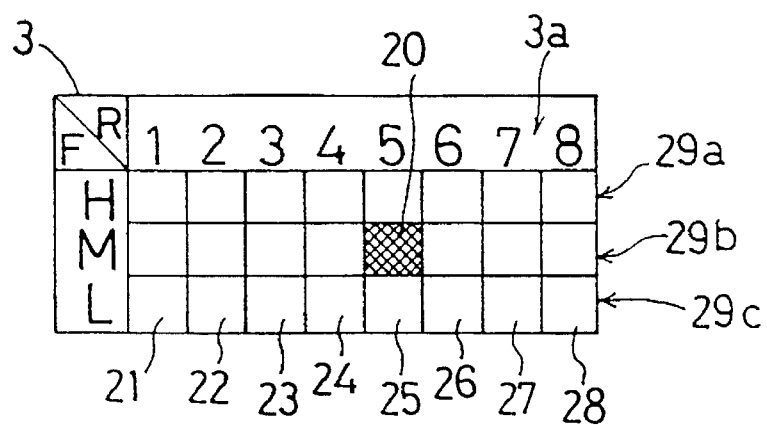
FIG. 5 is a front view of a first display panel in another embodiment.

The sideways staggered arrangement of the rear speed stage display elements as in the foregoing embodiment provides the advantage of displaying various gear ratios in interlock states resulting from combinations of speed stages of the front and rear derailleurs. However, as shown in FIG. 5, the rear speed stage display elements may be arranged without the stagger.

Figure 6:
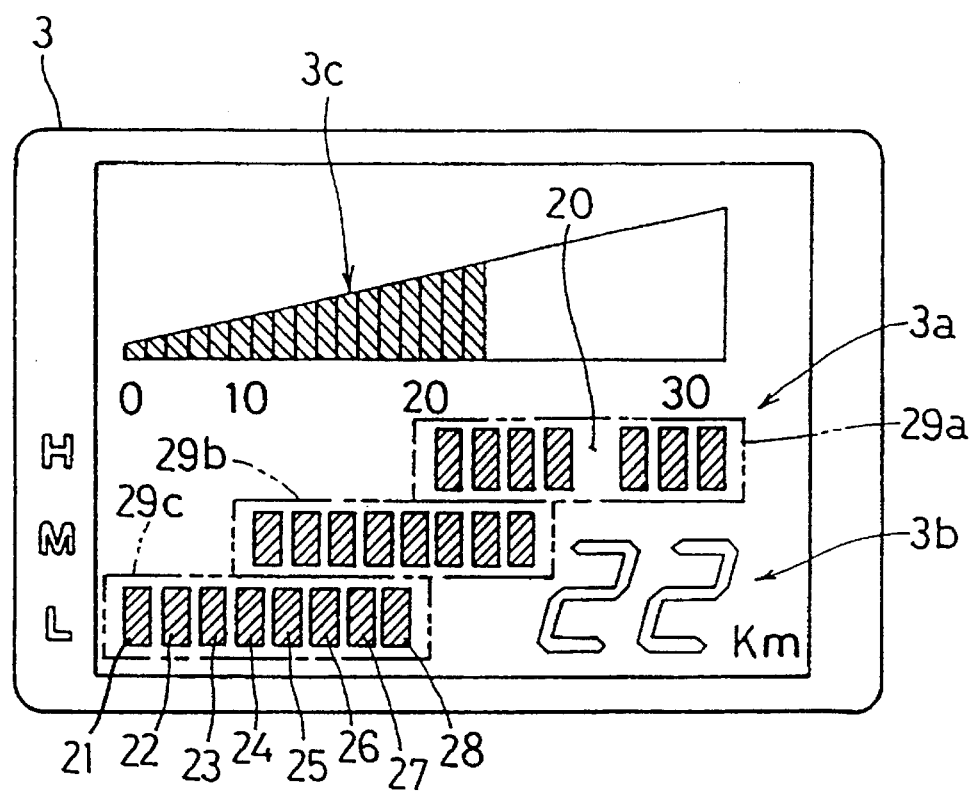
FIG. 6 is a front view of a first display panel in a further embodiment.

FIG. 6 shows a further modification of the first display panel 3. This display panel 3 includes, besides the first display area 3a and second display area 3b as shown in FIG. 4, a third display area 3c for providing an analog display of a running speed detected by the control mechanism 17. The third display area 3c is formed of a plurality of liquid crystal elements arranged across the display panel 3. An increase in the running speed is displayed by blacking the liquid crystal elements, with a black area enlarging from left end to right end of the display area 3c. That is, a fight end of a black portion of the display area 3c indicates a running speed. The first display area 3a and third display area 3c are arranged relative to each other such that a wheel driving gear ratio suited to the running speed is observed when the front and rear derailleurs are shifted to put in the colorless state one of the rear speed stage display elements 21–28 in the first display area 3a vertically aligned to the right end of the black portion of the third display area 3c. That is, the speed display in the third display area 3c and speed stage display in the first display area 3a indicate appropriate speed stages to which the front and rear derailleurs should be switched.

The present invention is applicable to a display apparatus for indicating appropriate speed stages to which the front and rear derailleurs should be switched as well as a display apparatus for displaying speed stages in which the front and rear derailleurs are actually operating.

In the foregoing embodiments, a display element corresponding to a speed stage is turned to the colorless state (as at 20 in the drawings) to act as the indicator. Alternatively, a display element may be given a color different from that of the other display elements to act as the indicator. Further, the present invention is applicable to a mechanical display apparatus having a display area formed of a plastic plate or the like, and one pointer slidable along or revolvable around the display area to indicate speed stages. Thus, the colorless state 20 and the pointer may be collectively called an indicating device 20.

What is claimed is:

1. A display apparatus for a bicycle comprising display means including:

a plurality of rear speed stage display sections for displaying a speed stage of a rear derailleur, each of said rear speed stage display sections being formed of a set of plurality of display elements;

a plurality of front speed stage display sections for displaying a speed stage of a front derailleur, each of said front speed stage display sections including one of said set of said display elements; and indicating means for operating only one of said display elements in only one of said set, thereby to indicate the speed stages of said front derailleur and said rear derailleur for all speed stages of said front derailleur and said rear derailleur; and wherein said each of said front speed stage display sections is formed as a display array by one of said set of said display elements, a plurality of said display arrays being, staggered relative to one another; and wherein said display arrays are arranged such that, where part of first display elements in one of said display arrays are substantially and vertically aligned to part of second display elements in another one of said display arrays, said part of said first display elements and said part of said second display elements display substantially the same wheel driving gear ratios.

2. The display apparatus as defined in claim 1, wherein said each of said front speed stage display sections is formed as a display array by one of said set of said display elements, a plurality of said display arrays being aligned to arrange said display elements in a matrix pattern.

3. The display apparatus as defined in claim 2, wherein said display elements in one of said set are arranged in order of wheel driving gear ratios.

4. The display apparatus as defined in claim 1, wherein said display elements in one of said set are arranged in order of wheel driving gear ratios.

5. The display apparatus as defined in claim 1, wherein said display elements in one set are formed of liquid crystal elements in a colorless state, said indicating means indicating speed stages of said front derailleur and said rear derailleur by coloring one of said display elements.

6. The display apparatus as defined in claim 1, wherein said display elements in one of said set are formed of liquid crystal elements in a colored state, said indicating means indicating speed stages of said front derailleur and said rear derailleur by changing one of said display elements to a colorless state.

7. A display apparatus for a bicycle comprising:

a plurality of front speed stage display sections for displaying a speed stage of a front derailleur, each of said front speed stage display sections corresponding to a speed stage of a front derailleur, and each front speed display section including a plurality of display elements, each display element corresponding to a speed stage of a rear derailleur;

wherein said plurality of display elements in said plurality of front speed display sections are aligned to form a two-dimensional matrix pattern comprising a plurality of rows of said plurality of display elements so that each display element corresponds to a different combined speed stage of said front derailleur and said rear derailleur;

indicating means for operating only one of said display elements to indicate each combined speed stage of said front derailleur and said rear derailleur for all speed stages of said front derailleur and said rear derailleur;

wherein said each of said front speed stage display sections is formed as a display array by one of set of said display elements, a plurality of said display arrays being, staggered relative to one another; and wherein said display arrays are arranged such that, where part of first display elements in one of said display arrays are substantially and vertically aligned to part of second display elements in another one of said display arrays, said part of said first display elements and said part of said second display elements display substantially the same wheel driving gear ratios.

8. The apparatus according to claim 7 wherein said plurality of rows are staggered relative to each other.

9. The display apparatus according to claim 7 wherein said plurality of display elements in said plurality of front speed display sections normally exhibit a default color scheme, and wherein said indicating means operates said only one of said display elements by causing said only one of said display elements to exhibit a color scheme different from said default color scheme.

10. The display apparatus according to claim 9 wherein said plurality of display elements in said plurality of front speed display sections normally exhibit a black color scheme, and wherein said indicating means operates said only one of said display elements by causing said only one of said display elements to be colorless.

11. The display apparatus according to claim 9 wherein said plurality of rows are staggered relative to each other.

* * * * *